United States Patent
Zhao (10) Patent No.: US 11,124,913 B2
(45) Date of Patent: Sep. 21, 2021

(54) LEVELING DEVICE, WASHING MACHINE WITH THE LEVELING DEVICE, AND CONTROLLING METHOD THEREOF

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventor: Zhiqiang Zhao, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 514 days.

(21) Appl. No.: 15/778,658

(22) PCT Filed: Jun. 29, 2017

(86) PCT No.: PCT/CN2017/090858
§ 371 (c)(1),
(2) Date: May 24, 2018

(87) PCT Pub. No.: WO2018/176666
PCT Pub. Date: Oct. 4, 2018

(65) Prior Publication Data
US 2019/0136443 A1 May 9, 2019

(30) Foreign Application Priority Data
Mar. 30, 2017 (CN) .......................... 201710202071.3

(51) Int. Cl.
*D06F 39/12* (2006.01)
*F16M 7/00* (2006.01)
(Continued)

(52) U.S. Cl.
CPC ............ *D06F 39/125* (2013.01); *D06F 33/00* (2013.01); *D06F 34/18* (2020.02); *D06F 39/00* (2013.01);
(Continued)

(58) Field of Classification Search
CPC .......... D06F 34/18; D06F 39/12; D06F 39/00; D06F 33/00; D06F 39/125;
(Continued)

(56) References Cited

U.S. PATENT DOCUMENTS 3,060,713 A * 10/1962 Burkall ................. D06F 39/087
68/23.2
3,327,507 A    6/1967 Landon
(Continued)

FOREIGN PATENT DOCUMENTS

CN     101023239 A    8/2007
CN     201151829 Y    11/2008
(Continued)

OTHER PUBLICATIONS

Notice of Reasons for Refusal issued by the Japanese Patent Office in corresponding Japanese Patent Application No. 2019-553018 dated Mar. 9, 2021 (5 pages including partial English translation).

*Primary Examiner* — Benjamin L Osterhout
(74) *Attorney, Agent, or Firm* — Buchanan Ingersoll & Rooney PC (57) ABSTRACT

The present disclosure provides a leveling device, a washing machine with the leveling device and controlling method thereof. The leveling device comprises a hydraulic support, the hydraulic support comprises: a fix section, installed on a bottom of the household appliance; a movable adjustment section, sleeved with the fix section and moving axially relative to the fix section; an accommodate chamber for containing a hydraulic medium is arranged between the fix (Continued)

section and the movable adjustment section; at least two hydraulic supports connected by a communication device, depending on the pressure changing, the hydraulic medium flows between the hydraulic supports, and drives the movable adjustment section using pressure to move axially direction for leveling under the pressure; a sensor connecting port for connecting a pressure sensor is arranged at the hydraulic supports and/or on the communication device, and the hydraulic medium is allowed to flow through the sensor connecting port.

12 Claims, 3 Drawing Sheets

(51) Int. Cl.
*F16F 15/023* (2006.01)
*D06F 39/00* (2020.01)
*D06F 33/00* (2020.01)
*D06F 34/18* (2020.01)

(52) U.S. Cl.
CPC .............. *D06F 39/12* (2013.01); *F16M 7/00* (2013.01); *F16F 15/023* (2013.01); *F16M 2200/044* (2013.01); *F16M 2200/08* (2013.01)

(58) Field of Classification Search
CPC .......... D06F 2204/065; D06F 2202/10; D06F 2204/086; F16M 7/00; F16M 2200/044; F16M 2200/08; F16F 15/023
See application file for complete search history.

(56) References Cited

U.S. PATENT DOCUMENTS

| | | | |
|---|---|---|---|
| 8,302,743 B2 | 11/2012 | Pike et al. | |
| 10,221,517 B2* | 3/2019 | Zhao | F16F 9/065 |
| 10,227,723 B2* | 3/2019 | Zhao | A47B 91/16 |
| 10,745,850 B2* | 8/2020 | Zhao | D06F 39/125 |
| 2004/0168480 A1* | 9/2004 | Lorenz | A47L 15/4295 68/12.06 |
| 2006/0180720 A1 | 8/2006 | Cournoyer et al. | |
| 2010/0154130 A1 | 6/2010 | Han et al. | |
| 2016/0025261 A1* | 1/2016 | Pike | A47B 91/10 248/188.5 |
| 2018/0187362 A1 | 7/2018 | Zhao et al. | |
| 2018/0195227 A1* | 7/2018 | Zhao | F16F 9/065 |
| 2018/0202095 A1* | 7/2018 | Zhao | F16M 7/00 |

FOREIGN PATENT DOCUMENTS

| | | |
|---|---|---|
| CN | 101749352 A | 6/2010 |
| CN | 101864891 A | 10/2010 |
| CN | 102417009 A | 4/2012 |
| CN | 102858204 A | 1/2013 |
| CN | 203141800 U | 8/2013 |
| CN | 204617469 U | 9/2015 |
| CN | 105755750 A | 7/2016 |
| CN | 105755757 A | 7/2016 |
| CN | 105757408 A | 7/2016 |
| FR | 2 655 131 A1 | 5/1991 |
| GB | 963047 A | 7/1964 |
| GB | 1 558 101 A | 12/1979 |
| JP | H05-146582 A | 6/1993 |
| JP | H05-300992 A | 11/1993 |
| JP | H11-198625 A | 7/1999 |
| KR | 10-1402975 B1 | 6/2014 |

* cited by examiner

LEVELING DEVICE, WASHING MACHINE WITH THE LEVELING DEVICE, AND CONTROLLING METHOD THEREOF

TECHNICAL FIELD

The present disclosure relates to the technical field of leveling and supporting for household appliance, specifically, relates to leveling device, washing machine with the leveling device and controlling method thereof.

BACKGROUND

A household appliance is generally provided with a leveling device at the bottom of its casing. During placement of the household appliance, the leveling device is adjusted to make the household appliance stably placed. After the household appliance is leveled, the leveling device can support the household appliance to keep the household appliance stable.

Taking a washing machine for example, the existing washing machine is usually provided with bolt supports mounted at the bottom of its casing or the whole machine. Each bolt support comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt supports into different lengths of the screw holes of the base plate. Mostly, the height of the washing machine is increased if the supports of the washing machine rotate counterclockwise, and the height of the washing machine is reduced if the supports of the washing machine rotate clockwise. After the height adjustment of the bolt supports is completed, the nut washers for preventing loosening are tightened to keep the washing machine stable.

Although said bolt supports of the washing machine implement the leveling of the washing machine, a user still needs to carry out manual adjustment. If the washing machine has a relatively large self weight or a placement space for the washing machine is narrow, it is very inconvenient to operate for user. Additionally, vibration of the washing machine in a long-term working process also act on the leveling supports and causes support failure of the supports, resulting in unlevel placement of the washing machine.

For example, an existing 80 KG drum washing machine generally has a weight of about 80 KG which is relatively heavy, so its height adjustment is very inconvenient for users. Even though the height adjustment is completed, it cannot be ensured that the washing machine is adjusted to an optimal state. If the washing machine works, especially accelerates from 0 r/min to about 1400 r/min for drying, large vibration will occur if the washing machine is placed unlevel or has a failure of support problem, which greatly influences use comfortableness of the user.

In addition, the vibration of the unlevel washing machine may cause loosening of support screws, which result in vertical movement of a support bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In addition, clothing weighting of the current washing machine needs to be calculated according to the back electromotive force of the motor, and the influent water also needs to separately set the pressure sensor or the flowmeter to measure, which increases the cost of the washing machine and has lower accuracy.

On that account, the present disclosure is proposed.

SUMMARY OF THE DISCLOSURE

For solving the above-mentioned problem, the present disclosure provides a leveling device, a washing machine with the leveling device and controlling method thereof, particularly, a technical solution adopted is as follows:

The first object of the disclosure is providing a leveling device for supporting and leveling a household appliance, comprising a hydraulic support. The hydraulic support comprises:

a fix section, installed on a bottom of the household appliance;

a movable adjustment section, sleeved on the fix section and moving axially relative to the fix section;

an accommodate chamber for containing a hydraulic medium, is arranged between the fix section and the movable adjustment section;

at least two hydraulic supports are communicated with each other by a communication device, depending on the pressure changing, the hydraulic medium flows between the hydraulic supports, and drives the movable adjustment section to move axially for leveling under the pressure;

a sensor connecting port for connecting a pressure sensor is arranged at the hydraulic supports and/or on the communication device, and the hydraulic medium is allowed to flow through the sensor connecting port.

Furthermore, the communication device comprising a hydraulic tube and a communication member, one end of the hydraulic tube is connected to the hydraulic supports, and another end is connected to a same communication member, the communication member is internally provided with a liquid flow channel communicated with each other for communicating between the hydraulic supports; the sensor connecting port is arranged on the communication member and communicates with the liquid flow channel.

Furthermore, the sensor connecting port is a sensor connecting nozzle arranged on the communication member, the sensor connecting nozzle is hermetically connected with one end of a pressure pipe, and the other end of the pressure pipe is connected with the pressure sensor.

Furthermore, the fix section comprises a hydraulic plate and a sheath connecting with the hydraulic plate, a hollow chamber is arranged in the sheath and extends axially through the sheath;

the movable adjustment section is an adjustable element, an inner chamber with one opening end is arranged in the adjustable elements; one end of the sheath is sleeved inside the adjustable element, and is capable of moving axially relative to the adjustable element; the hollow chamber and the inner chamber form the accommodate chamber together;

The hydraulic plate is internally provided with a hydraulic plate flow channel for allowing the hydraulic medium to flow, and the hydraulic plate flow channels of hydraulic supports are connected with each other by the communication device for allowing the hydraulic medium to flow between the hydraulic supports.

Furthermore, the sensor connecting port is arranged on the hydraulic plate, and is communicated with the hydraulic plate flow channel.

Furthermore, the sensor connecting port is the sensor connecting nozzle arranged on the hydraulic plate, and the sensor connecting nozzle is hermetically connected with one end of the pressure pipe, and the other end of the pressure pipe is connected with the pressure sensor.

The second object of the present disclosure is providing a washing machine with the leveling device that mentioned above, and the washing machine comprises a shell, the pressure sensor, and a control device, and the leveling device is installed at the bottom of the shell; the pressure sensor connects with the sensor connecting port of the leveling device by the pressure pipe, and the pressure sensor electrically connects with the control device.

The third object of the present disclosure is providing a controlling method of the washing machine. If the washing machine is empty, the control device obtaining a pressure information P1 detected by the pressure sensor; if the washing machine is loaded with laundry, the control device obtaining a pressure information P2 detected by the pressure sensor;

the control device of the washing machine calculating a weight of the laundry put into the washing machine based on the pressure difference P2-P1.

Furthermore, the control device of the washing machine selecting water level according to the weight calculated of the laundry put into the washing machine and controlling the supply of water;

the control device obtaining a pressure information P3 detected by the pressure sensor in real time, and calculating a weight of water to be supplied according to a pressure difference P3-P2, if the weight of water to be supplied reaches a weight corresponding to washing water level, stopping supplying water.

Furthermore, the control device of the washing machine obtaining the pressure information P4 detected by the pressure sensor after supplying water is completed;

during a washing, rinsing, and dehydrating processes of the washing machine, the control device obtaining a pressure information P0 detected by the pressure sensor in real time; if the pressure difference of P0-P4 exceeds a preset value, the control device controlling to reduce rotation speed of the washing machine.

The leveling device in the present disclosure is based on hydraulic principle. Because of the uneven pressure generated, the liquidity of the hydraulic medium allows the movable adjustable section to adjust automatically and adaptively until leveling device reaches equilibrium. Then the hydraulic medium stops flowing to achieve automatic leveling.

The leveling device in the present disclosure is provided with the sensor connecting port arranged on the hydraulic support and/or on the communication device for connecting with the pressure sensor. And the leveling device detects the real time pressure change of the hydraulic supports by the pressure sensor to realize detecting the weight and the working mode of the household appliance.

Reference Signs: 100—hydraulic support 101 hydraulic plate 1011—hydraulic nozzle 1012—hydraulic plate flow channel 102—hydraulic medium 103—sheath 104—adjustable element 200—hydraulic tube 300—communication member 301—sensor connecting nozzle 302—liquid flow channel 303—connection nozzle 400—inner tub 500—outer tub 600—wash water 700—laundry 800—shell 900—pulsator 1000—bottom plate 1100—pressure pipe 1200—pressure sensor 1300—wire 1400—control device.

DETAILED DESCRIPTION

A leveling device, a washing machine with the leveling device, and controlling method thereof are described in detail as follows with reference to the accompanying drawings below:

Embodiment 1

Figure 1:
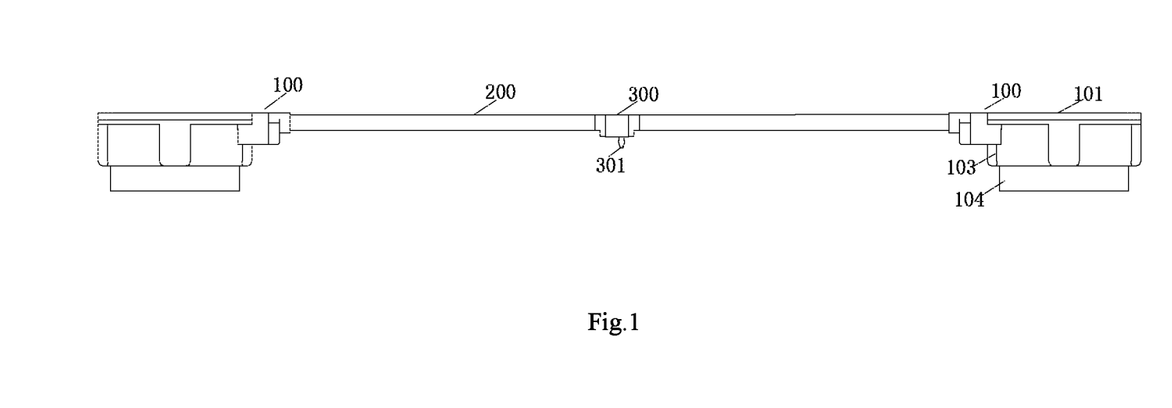
FIG. 1 is a front view of the leveling device according to the embodiment 1 of the present disclosure.
Figure 2:
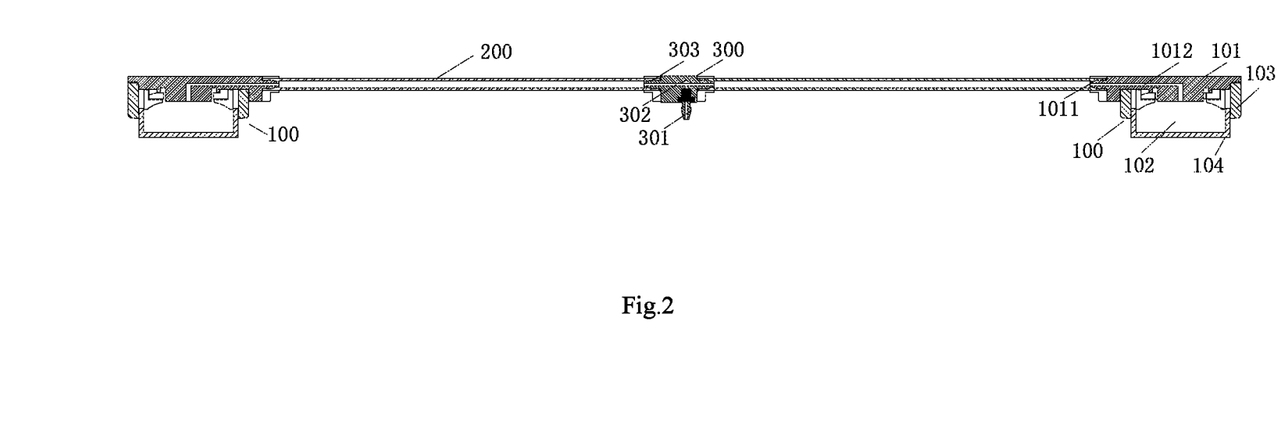
FIG. 2 is a section view of the leveling device according to the embodiment 1 of the present disclosure.

As shown in FIG. 1 to FIG. 2, a leveling device in the present embodiment is for supporting and leveling a household appliance comprises a hydraulic support. The hydraulic support 100 comprises:

a fix section, installed on a bottom of the household appliance;

a movable adjustment section, sleeved with the fix section and moving axially relative to the fix section;

an accommodate chamber for containing a hydraulic medium 102, is arranged between the fix section and the movable adjustment section;

at least two hydraulic supports 100 are communicated with each other by a communication device, depending on the pressure changing, the hydraulic medium 102 flows between the hydraulic supports 100, and drives the movable adjustment section to move axially for leveling under the pressure;

a sensor connecting port for connecting a pressure sensor is arranged at the hydraulic supports 100 and/or on the communication device, and the hydraulic medium is allowed to flow through the sensor connecting port.

The leveling device of the present embodiment is based on the hydraulic principle. Because of the uneven pressure generated, the mobility of hydraulic medium allows the movable adjustment section to adjust automatically and adaptively until the leveling device reaches equilibrium. Then the hydraulic medium stops flowing medium, and automatic leveling is achieved.

The leveling device in the present embodiment is provided with the sensor connecting port arranged on hydraulic supports 100 and/or on the communication device for connecting with the pressure sensor. The change of the pressure of the hydraulic supports 100 could be real-time detection by the pressure sensor, and that realizes detecting the weight and working mode of the household appliance.

The sensor connecting port in the present embodiment may be arranged on the hydraulic supports 100, or may be provided on the communication device, or may be arranged on both, as long as it can communicate with hydraulic medium.

Specifically, the communication device in the present embodiment comprises a hydraulic tube 200 and a communication member 300, and one end of the hydraulic tube 200 is connected to hydraulic supports 100, while the other end is connected to a same communication member 300.

The communication member is internally provided with a liquid flow channel communicated with each other for communicating between the hydraulic supports. The sensor connecting port is arranged on the communication member 300, and communicates with liquid flow channel 302.

According to the communication manner of the hydraulic support 100 in this embodiment, the sensor connection port is disposed on the communication member 300, and the implementation is simpler.

Furthermore, the sensor connecting port is a sensor connecting nozzle 301 arranged on the communication member 300. The sensor connecting nozzle 301 is hermetically connected with one end of a pressure pipe, and the other end of the pressure pipe is connected with the pressure sensor. The setting of the sensor connecting nozzle 301 makes the connection with pressure pipe and the pressure sensor easier.

As a preferred embodiment of the present embodiments, the fix section comprises a hydraulic plate 101, and a sheath 103 connecting with the hydraulic plate 101. The sheath 103 is provided with a hollow chamber extending axially through the sheath. The movable adjustment section is an adjustable elements 104, and an inner chamber with one opening end is arranged in the adjustable elements. One end of the sheath 103 is sleeved in the adjustable elements 104, and is capable of moving axially relative to the adjustable elements. The hollow chamber and the inner chamber form a accommodate chamber together.

The hydraulic plate 101 is internally provided with the hydraulic plate flow channel 1012 for allowing the hydraulic medium to flow medium. And the hydraulic plate flow channels 1012 of the hydraulic supports 101 are connected with each other by the communication device for allowing the hydraulic medium to flow between the hydraulic supports.

The sensor connecting port of the present embodiment may also be arranged on the hydraulic supports 100. Specifically, the sensor connecting port is arranged on the hydraulic plate 101 and communicated with the hydraulic plate flow channel 1012.

Specifically, the sensor connecting port is the sensor connecting nozzle arranged on the hydraulic plate 101, and the sensor connecting nozzle is hermetically connected with one end of the pressure pipe, and the other end of the pressure pipe is connected with the pressure sensor.

In addition, a detachable sealing element may be installed hermetically on the sensor connecting port of the present embodiment. when it is not necessary to connect the pressure sensor, the sealing element is installed hermetically on the sensor connecting port to keep it closed, the leveling device works normally. When it is necessary to connect the pressure sensor, the sealing element is removed, and the sensor connecting port is connected with the pressure pipe.

As one of the preferred mode embodiments of the present embodiment, a spacing sliding block/spacing sliding chute is arranged on the peripheral wall of the sheath 103, and a spacing sliding chute/spacing sliding block is arranged on the inner wall of the inner chamber of the adjustable elements. The spacing sliding block slides axially along the spacing sliding chute to limit the relative rotation between the adjustable elements and sheath. The embodied method prevents the relative rotation between the sheath 103 and the adjustable elements 104, so that both parts can only conduct axial movement, and the leveling process is more stable and efficient.

Furthermore, a limit stop is arranged at the end of the spacing sliding chute for preventing the spacing sliding block sliding off.

The hydraulic supports 100 of the present embodiment uses hydraulic principle to achieve leveling, therefore the sealing performance of the hydraulic medium 102 greatly affects the leveling result of the hydraulic supports 100. As an seal method of the hydraulic medium 102 in the present embodiment, the fix section and the movable adjustment section are dynamically sealed and connected. In this way, a sealed accommodate chamber can be formed between the fix section and the movable adjustment section, and the sealing of the hydraulic medium 102 can be achieved. Specifically, in the present embodiment, the hydraulic plate 101 is connected with the sheath 103 in a static seal manner, and the sheath 103 is connected with the adjustable elements 104 by dynamic sealing.

As another sealing method of the hydraulic medium 102 in the present embodiment, the hydraulic supports 100 comprises a flexible accommodation body arranged in the accommodate chamber, and the flexible accommodation body has a chamber inside, and the hydraulic medium 102 is arranged in the chamber. The flexible accommodation body is deformed 102 depending on the deformation of the hydraulic medium due to compression/expansion medium, and drives the movable adjustment section to move along the axis of the outer part of the fix section for leveling.

Specifically, the flexible accommodation body comprises an opening, and the opening of the flexible accommodation body is sealed installed on the hydraulic plate 101 and connected with the hydraulic plate flow channel 1012. In this embodiment, the hydraulic medium 102 is accommodated in the flexible accommodation body, and the flexible accommodation body only need to be sealed and connected with the hydraulic plate 101, which simplifies the installation process of the hydraulic plate 101, the sheath 103, and the adjustable elements 104.

The hydraulic plate 101 in the present embodiment is provided with a hydraulic nozzle 1011, and the hydraulic nozzle 1011 is connected with the hydraulic plate flow channel 1012 in the hydraulic plate. The communication member 300 is provided with a connection nozzle 303 and the connection nozzle is connected with the liquid flow channel 302 in the communication member. The both ends of the hydraulic tube 200 are respectively connected with the hydraulic nozzle 1011 and the connection nozzle 303.

The communication member 300 in the present embodiment is provided with a filling opening, and the filling opening is connected with the liquid flow channel 302 in communication member 300. In this way, after the hydraulic medium 102 is injected through the pouring port and is filled in the hydraulic support, the filling opening is sealed with the sealing element. The filling method of the hydraulic medium 102 in the present embodiment is simple and convenient, which greatly simplifies the filling mode of the hydraulic medium.

The sensor connecting port in the present embodiment can also be a sensor connecting nozzle 301 detachably sealed and installed on the filling opening. When the hydraulic medium 102 is infused, the sensor connecting nozzle 301 is detached, or is directly poured through the sensor connection nozzle 301.

The flexible accommodation body in the present embodiment comprises an accommodation body, and the accommodation body is a soft cystic structure having a corrugated structure of collapsible, the corrugated structure is arranged in the adjustable elements 104. The adjustable element 104 is driven to move along the axial direction of the sheath 103 for leveling along with the flow expansion of the hydraulic medium.

The hydraulic supports in the present embodiment also comprises a protection ring for protecting the flexible accommodation body. The pressing ring is embedded in the protection ring. That has the following technical effects:

1. The embedded installation between the pressing ring and the protection ring in the present embodiment can play a limiting role, which avoids setting a complicated limiting structure, and the present structure is simple and stable 2. When the hydraulic supports in the present embodiment is under great impact pressure (such as when a household appliance or an article installed with the hydraulic support is dropped or lifted and suddenly placed), there is no space between the protection ring and the press fit surface of the flexible accommodation body, so as to avoid problems such as expansion and rupture of the flexible accommodation body, and the reliability is improved.

3. In this embodiment, the pressure ring and the protection ring are installed in an embedded manner, which reduces the installation height of the pressure ring and the protection ring, thereby reducing the overall height of the hydraulic support, and the impact on the overall center of gravity of the household appliance is smaller. It is more conducive to the stability of the support of household appliances, and has a better shock absorption effect for vibrations in the working process of household appliances (such as the dehydration vibration of a washing machine).

As the preferred embodiment method of the present embodiment, one end of the protection ring is provided with a protection curving surface, and the protection curing surface is matched with the outer surface of the flexible accommodation body for avoiding rupture of the flexible accommodation body under pressure.

the other end of the protection ring in the present embodiment is provided with an embedded groove, and the pressing ring is embedded in the embedded groove of the protection ring.

As a preferred embodiment method of the present embodiment, a limiting protrusions is disposed on the inner wall of the embedded groove of the protection ring, and a limiting recess cooperated with the limiting protrusions is arranged on the fix section. The limiting structure of the present embodiment is designed according to the embedded installation of the pressing ring and the protection ring, and the limit movement is realized at the same time of the embedded installation, and the structure is simple, stable, and reliable.

In this embodiment, the pressing ring is fully surround by the outer circumference of the protection ring, and only the protection ring is pressed into the adjustable elements 104, which greatly improves the reliability and the stability of the fitting. Therefore, after the protection ring is pressed into the adjustable elements 104, the protection ring will always move axially in the adjustable elements 104, and the movement is smooth and reliable. Both of them will realize the stability of the entire hydraulic supports, and a certain amount of movability existing between the protection ring and the pressing ring in the up and down direction.

Since household appliances (such as washing machines) generally generate vibration when they work, to ensure the operation stability of the household appliance, the hydraulic supports should reduce its overall height as much as possible to to lower the gravity center of the household appliance. Hence, in this embodiment, an escape port is arranged on the hydraulic plate 101 corresponding to the spacing sliding block, and while satisfying the setting of the limiting mechanism, the axial movement of the adjustable elements 104 is not affected, and the overall height of the hydraulic supports can be reduced and the vibration stability can be improved.

Embodiment 2

Figure 3:
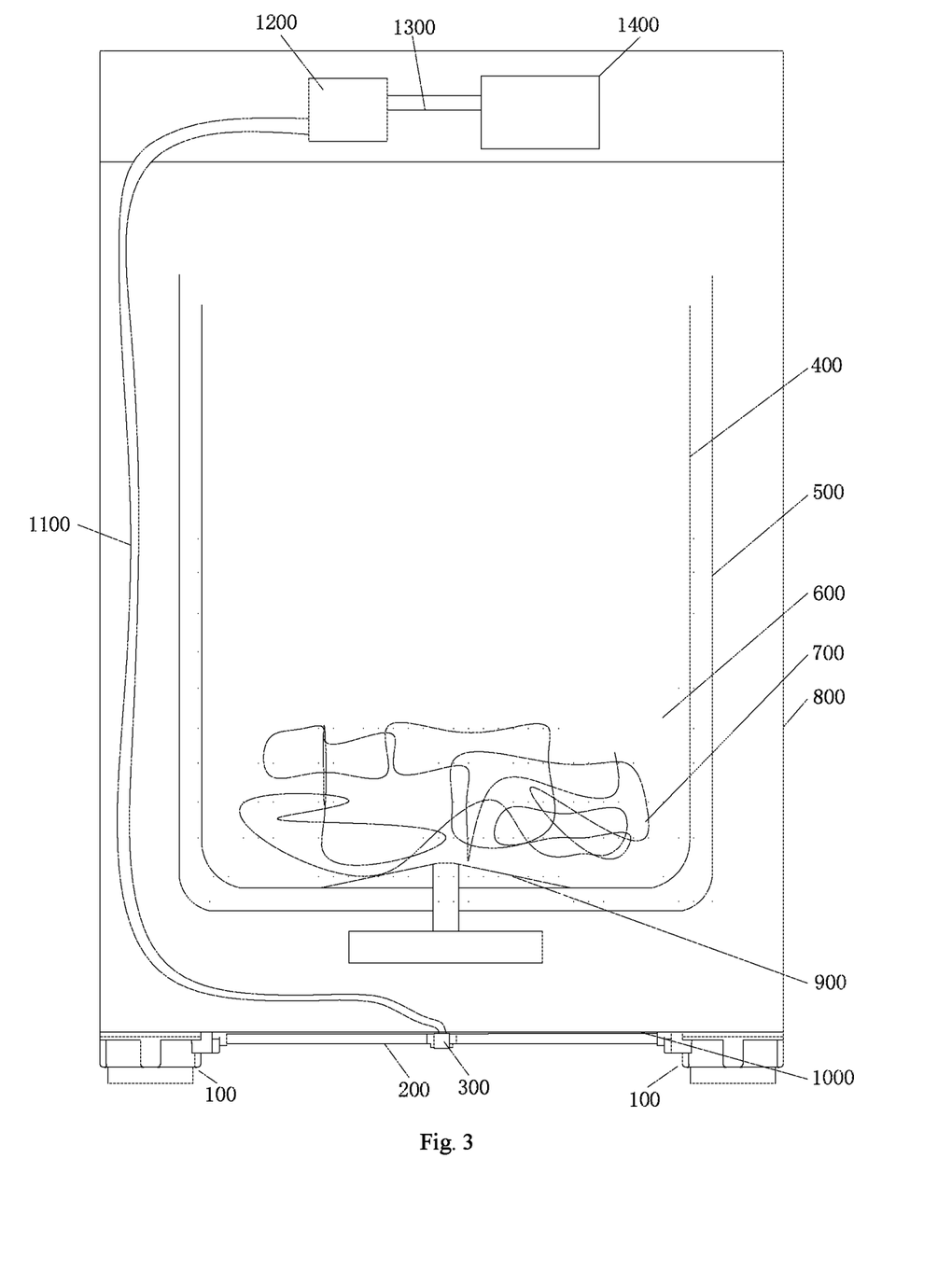
FIG. 3 is a structural view of the washing machine according to the embodiment 2 of the present disclosure.

As shown in FIG. 1 to FIG. 3, the present embodiment provides a washing machine with the leveling device that described in embodiment 1. The washing machine comprises a shell 800, a pressure sensor 1200, and a control device 1400. The leveling device is installed at the bottom of the shell 800, the pressure sensor 1200 connects with sensor connecting port of the leveling device by the pressure pipe 1100, and the pressure sensor 1200 electrically connects with the control device 1400. The washing machine in the present embodiment connects the pressure sensor 1200 with the hydraulic supports of the leveling device. The pressure sensor 1200 obtains the weight and working state information of the washing machine by obtaining the pressure information of the hydraulic medium in the hydraulic supports.

The washing machine in the present embodiment is installed with leveling device. Due to the unevenness of the floor, the different hydraulic supports 100 has different horizontal height, and the adjustable elements 104 may stretch or shorten to achieve the same internal hydraulic pressure and complete the automatic adjustment of the washing machine. During the washing and dehydrating process of the washing machine, because of the flowing of the hydraulic medium for leveling, the noise of the washing machine is significantly reduced.

The pressure sensor 1200 in the present embodiment electrically connects with the control device 1400 by wire 1300, and the wire 1300 comprises a signal line and a power line.

In the present embodiment, the shell 800 of the washing machine comprises a bottom plate 1000, and the leveling device is installed on the bottom plate 1000. An outer tub 500 and an inner tub 400 are co-axially arranged in the shell 800, and the outer tub 500 is for water, which contains wash water 600 inside. The inner tub 400 is rotatably disposed in the outer tub 500. The laundry 700 is placed in the inner tub 400, and the rotatable pulsator 900 is disposed at the bottom of the inner tub. The pulsator 900 rotates to agitate the water to wash the laundry 700.

The principle and method for realizing the automatic leveling of the washing machine is by the leveling device in the present embodiment. After installation of the washing machine, different hydraulic supports have different horizontal height because of the ground unevenness, and the hydraulic supports at dent part of the ground is at low position. From this, it is known that the hydraulic supports at the high position firstly bear the weight of the washing machine, and the weight is heavy, while the hydraulic supports at the low position hold smaller gravity because of a failure of support problem.

The adjustable elements of the hydraulic supports at the high position will move up under larger pressure, and the height of the entire bottom supports will become smaller, and the volume of the hollow chamber of the flexible accommodation body filled with hydraulic medium will be compressed and turn smaller. The hydraulic medium is forced to enter into the hydraulic supports at the low position by orifice or valve opening through high pressure pipe, and the amount of the hydraulic medium in the flexible accommodation body of the hydraulic supports at the low position becomes more and more, which makes the flexible accommodation body expand and drive the adjustable elements to elongate.

When the hydraulic pressure of the bottom supports at the high position and at the low position are the same, the hydraulic medium no longer moves through the high pressure pipe, and the relative position of the adjustable elements and the washing machine stop changing, which achieves the automatic adjust of the washing machine.

During the washing and dehydrating process of the washing machine, as the hydraulic medium slowly flows to achieve self leveling, the noise of the washing machine is significantly reduced.

The hydraulic medium of the present embodiment may be hydraulic oil, which has good liquidity and stable composition.

In addition, the leveling device in the present embodiment also can applied to device other than washing machine, such as refrigerator, freezer, air condition indoor unit, and other household appliance.

Embodiment 3

The present embodiment provides a control method of the washing machine in the embodiment 2. The control device obtains pressure information P1 detected by the pressure sensor, if the washing machine is empty. Then the control device obtains the pressure information P2 detected by the pressure sensor, if the washing machine is loaded. The control device calculates the weight of the laundry put into the washing machine based on the pressure difference from P2 to P1 that is P2−P1.

The control method of the washing machine in the present embodiment avoids the process using motor rotation to detect laundry weight of the washing machine, and that saves energy and time.

Furthermore, the control device of the washing machine selects the corresponding water level according to the weight calculated of the laundry put into the washing machine and controls to supply water. The control device obtains a pressure information P3 detected by the pressure sensor in real time, and calculates the weight of water to be supplied according to a pressure difference P3−P2. If the weight of water to be supplied reaches the selected water level, water is stopped to be supplied. The control method of the washing machine in the present embodiment avoids the problem of installing a water level sensor or a flowmeter.

Furthermore, the control device of the washing machine obtains the pressure information P4 detected by the pressure sensor after supplying water is completed. During a washing, rinsing, and dehydrating processes of the washing machine dehydrating, the control device obtains a pressure information P0 detected by pressure sensor in real time. If the pressure difference of P0−P4 exceeds the preset value, the control device controls to reduce rotation speed of the washing machine. When there is excessive eccentricity of the laundry, the washing machine will shake during dehydrating process, and even the outer tub hits the shell. During dehydrating process, the control device of the washing machine obtains the pressure information detected by the pressure sensor. The pressure or stress in the hydraulic supports will change. When the pressure exceeds the preset value, the washing machine stops high speed mode, redistributes the laundry, and uses high speed mode again, so as to prevent the outer tub from colliding with the shell and causing more serious damage. At the same time, the mechanical structure such as the slam bar of the existing washing machine is also reduced.

It should be noted: the above embodiments of the present disclosure may be implemented separately or in combination with a plurality of the embodiments.

The above is only the preferred embodiments of the present disclosure, but not intends to limit the present disclosure in any form. Although the present disclosure has been disclosed in terms of the preferred embodiments, it is not intended to limit the present disclosure. Without departing from the technical field of the present disclosure, any person skilled in the art familiar with the present patent, without departing from the scope of the present disclosure, can utilize the technical content of the above. Any person skilled in the art can make changes or conduct equivalent modifications by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. A washing machine comprising a shell, a pressure sensor, a control device, and a leveling device, wherein
the leveling device is installed at a bottom of the shell; the pressure sensor is connected with a sensor connecting port of the leveling device by a pressure pipe, and the pressure sensor is electrically connected with the control device;
the leveling device comprises hydraulic supports, each of the hydraulic supports comprise:
a fix section, installed on a bottom of the washing machine;
a movable adjustment section, sleeved on/in the fix section and moving axially relative to the fix section;
an accommodation chamber for containing a hydraulic medium is arranged between the fix section and the movable adjustment section; wherein
the hydraulic supports are communicated with each other by a communication device,
the hydraulic medium is configured to flow between the hydraulic supports, and drive the movable adjustment section to move axially for leveling under the pressure depending on the pressure changing;
the sensor connecting port for connecting the pressure sensor is arranged on at least one of the hydraulic supports and/or on the communication device, and the hydraulic medium is allowed to flow through the sensor connecting port;
wherein
when the washing machine is empty, the control device is configured to obtain a pressure information P1 detected by the pressure sensor;
when the washing machine is loaded with laundry, the control device is configured to obtain a pressure information P2 detected by the pressure sensor;
the control device of the washing machine is configured to calculate a weight of the laundry put into the washing machine based on a first pressure difference P2−P1.

2. The washing machine with a leveling device according to claim 1, wherein the communication device comprises hydraulic tubes and a communication member, one end of each of the hydraulic tubes is connected to one of the hydraulic supports, and another end of each of the hydraulic tubes is connected to the communication member, the communication member is internally provided with a liquid flow channel communicated with each other for communicating between the hydraulic supports; and the sensor connecting port is arranged on the communication member and communicates with the liquid flow channel.

3. The washing machine with a leveling device according to claim 2, wherein the sensor connecting port is a sensor connecting nozzle arranged on the communication member, the sensor connecting nozzle is hermetically connected with one end of the pressure pipe, and another end of the pressure pipe is connected with the pressure sensor.

4. The washing machine with a leveling device according to claim 1, wherein the fix section comprises a hydraulic plate and a sheath connecting with the hydraulic plate, a hollow chamber is arranged in the sheath and extends axially through the sheath;

the movable adjustment section is an adjustable element, an inner chamber with one opening end is arranged in the adjustable element; one end of the sheath is sleeved inside the adjustable element and is capable of moving axially relative to the adjustable element; the hollow chamber and the inner chamber form the accommodation chamber together;

each hydraulic plate is internally provided with a hydraulic plate flow channel for allowing the hydraulic medium to flow, and the hydraulic plate flow channels of the hydraulic plates are connected with each other by the communication device for allowing the hydraulic medium to flow between the hydraulic supports.

5. The washing machine with a leveling device according to claim 4, wherein the sensor connecting port is arranged on the hydraulic plate, and is communicated with the hydraulic plate flow channel.

6. The washing machine with a leveling device according to claim 5, wherein the sensor connecting port is a sensor connecting nozzle arranged on the hydraulic plate, and the sensor connecting port nozzle is hermetically connected with one end of the pressure pipe, and the other end of the pressure pipe is connected with the pressure sensor.

7. The washing machine with a leveling device according to claim 1, wherein the control device of the washing machine is configured to select a water level according to the weight calculated of the laundry put into the washing machine and controlling a supply of water;

the control device configured to obtain a pressure information $P3$ detected by the pressure sensor in real time and calculating a weight of water to be supplied according to a second pressure difference $P3-P2$, and when the weight of water to be supplied reaches a weight corresponding to a washing water level, stop supplying water.

8. The washing machine with a leveling device according to claim 7, wherein the control device of the washing machine is configured to obtain a pressure information $P4$ detected by the pressure sensor after supplying water is completed;

during a washing, rinsing and dehydrating processes of the washing machine, the control device is configured to obtain a pressure information $P0$ detected by the pressure sensor in real time; and when a third pressure difference of $P0-P4$ exceeds a preset value, the control device is configured to reduce a rotation speed of the washing machine.

9. A controlling method of the washing machine according to claim 1, wherein, when the washing machine is empty, the control device obtains a pressure information $P1$ detected by the pressure sensor;

when the washing machine is loaded with laundry, the control device obtains a pressure information $P2$ detected by the pressure sensor;

the control device of the washing machine calculates a weight of the laundry put into the washing machine based on a first pressure difference $P2-P1$.

10. The controlling method according to claim 9, wherein, the control device of the washing machine selects a water level according to the weight calculated of the laundry put into the washing machine and controls a supply of water;

the control device obtains a pressure information $P3$ detected by the pressure sensor in real time and calculates a weight of water to be supplied according to a second pressure difference $P3-P2$, and when the weight of water to be supplied reaches a weight corresponding to a wash water level, stops supplying water.

11. The controlling method according to claim 9, wherein, the control device of the washing machine obtains a pressure information $P4$ detected by the pressure sensor after supplying water is completed;

during a washing, rinsing and dehydrating processes of the washing machine, the control device obtains a pressure information $P0$ detected by the pressure sensor in real time; and when a third pressure difference of $P0-P4$ exceeds a preset value, the control device reduces a rotation speed of the washing machine.

12. The controlling method according to claim 10, wherein, the control device of the washing machine obtains a pressure information $P4$ detected by the pressure sensor after supplying water is completed;

during a washing, rinsing and dehydrating processes of the washing machine, the control device obtains a pressure information $P0$ detected by the pressure sensor in real time; and when a third pressure difference of $P0-P4$ exceeds a preset value, the control device reduces a rotation speed of the washing machine.

* * * * *